United States Patent [19]

Rangel-Garza et al.

[11] 3,897,009

[45] July 29, 1975

[54] TRICKLE IRRIGATION SYSTEM

[76] Inventors: Javier Rangel-Garza; Jaime Leal-Diaz, both of Escobedo 733, Sur Suite 316, Monterrey, Nuevo Leon, Mexico

[22] Filed: Apr. 2, 1973

[21] Appl. No.: 346,997

Related U.S. Application Data

[63] Continuation of Ser. No. 159,663, July 6, 1971, abandoned.

[52] U.S. Cl. .............. 239/542; 138/42; 239/547
[51] Int. Cl. .................................. B05b 15/00
[58] Field of Search ............ 259/542, 549; 138/42

[56] References Cited
UNITED STATES PATENTS

| | | | |
|---|---|---|---|
| 3,586,239 | 6/1971 | Blass | 239/542 |
| 3,604,728 | 9/1971 | Symcha et al. | 239/542 |
| 3,667,685 | 6/1972 | Rinkewich | 239/542 |
| 3,729,142 | 4/1973 | Rangel-Garza et al. | 239/542 |

*Primary Examiner*—Lloyd L. King

[57] ABSTRACT

An irrigation system has branch pipes coupled to a main water feeder pipe by plastic T connectors piercing the feeder pipe and reducing the water flow to the branch pipes. In the branch pipes are tricklers having two part female and male interfitting members. Grooves on the male member engage the inner female surface to provide water flow channels on the inner circumference of the central pipe bore to reduce pressure. These tricklers are coupled in line in a pipe or hose and have structure for locking the parts together and preventing entry of dirt.

2 Claims, 14 Drawing Figures

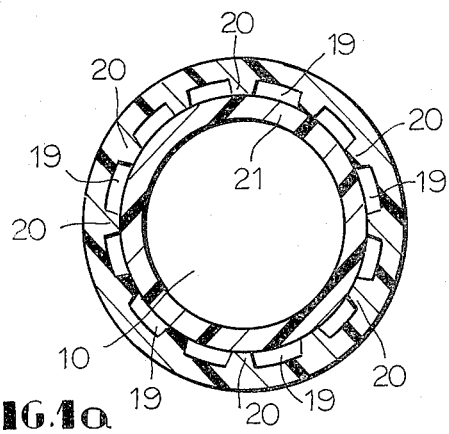
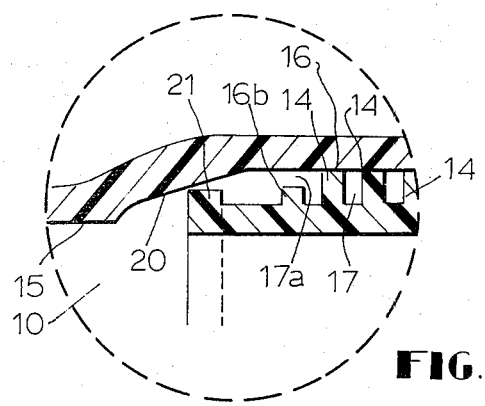
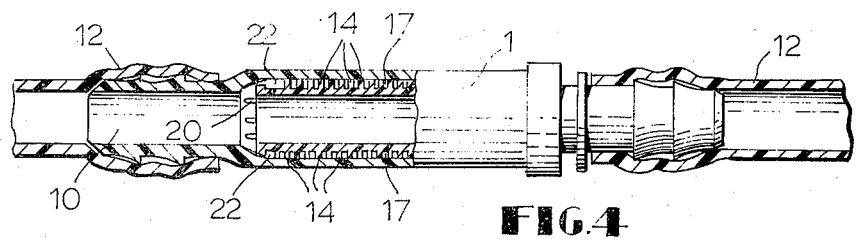
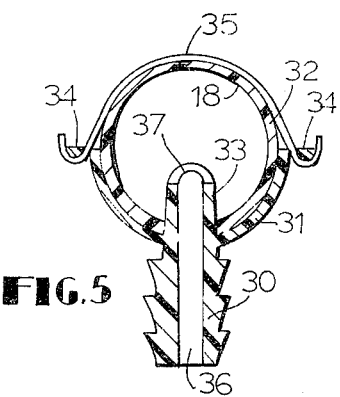
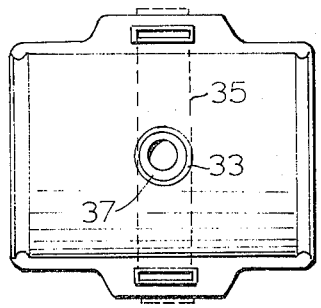
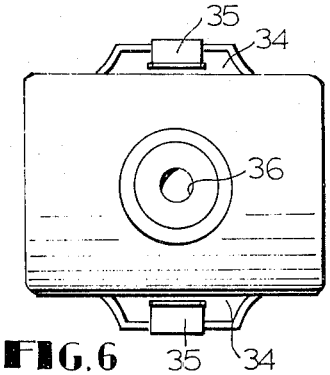
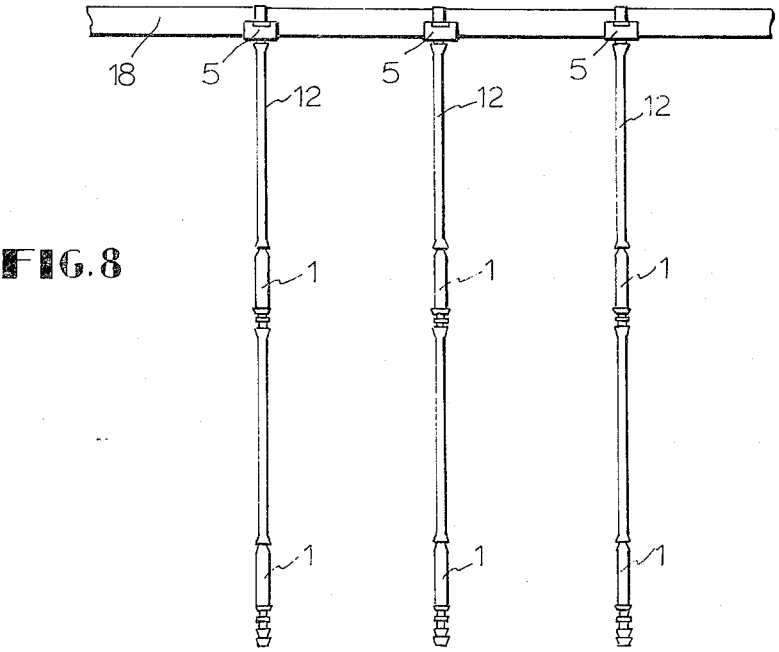

TRICKLE IRRIGATION SYSTEM

This is a continuation, of application Ser. No. 159,663, filed July 6, 1971, now abandoned, The present invention is related to improvements to a trickle irrigation systems and specifically to a trickler and a reduction T connector and to the form in which they are coupled to hoses and flexible or rigid pipes to get the service for which they are produced, made of plastics or similar materials.

Up to now, there are some trickler irrigation systems in which, are used tricklers that because of their design require individual regulation and it is impossible to use them for large irrigation systems, and other systems, in which are used tricklers that altrouch do not need individual regulation require costly conservation practices, can be connected only to calibrated hoses or pipes and can not be modified to adapt them to specific conditions. With the system object of this application and more specifically with the improvements of the trickler that latter will be described and we demand as our invention and to the reduction T connector, also specific object of the present application, it is possible the irrigation of large areas due to the following reasons: first, the advantage that there are no losses of water from the source to the irrigation area; second, the unitary regulation of the tricklers of the irrigation is not needed, making possible the irrigation of large areas, minimizing the water losses in the irrigated field and the application of water in the required amounts depending upon soils, climate and crops and to apply in the trickler spots, the water technically and scientifically necessary to satisfy the crop water needs, to obtain the optimum growth and productivity of the irrigated crops; third, it is possible by mean of the present irrigation system, to apply chemicals as insecticides, fungicides, fertilizers and soil amendments and other substances, in regulated amounts also technically and scientifically determined according to the requirements of the work conditions and the crop; fourth, the tricklers can be connected to uncalibrated pipes; fifth, the cleaning of the tricklers is possible without the need of injecting costly chemicals since the tricklers can be opened and cleaned one by one; sixth, the tricklers can be modified to adapt them to different flows or working conditions; seventh, the reducing T connector can allow to join the tricklers to hoses or pipes of different diameters also, making this unit very versatile; eight, the filtering mechanism insures a longer operation without the need of cleaning lines and the operation without costly filtering systems.

The detailed characteristics of the trickler and reduction T connector, previously mentioned, are shown clearly in the following description and the attached drawings as an illustration of them and helping the referred signs to show the same parts illustrated in the drawn figures.

FIG. 1, shows a lateral view in cut of the trickler assembled the two main parts, the male and the female one.

FIG. 1 a, shows a transversal cut of male and female parts in which it is shown: first, the female part; second, the male part and the striae of the female part when in contact with the lower border of the male part.

FIG. 1 b, shows a transversal section in cut of the female parts and of the male part, corresponding to this section and cut as shown in FIG. 1 as 1 b.

Figure 3:
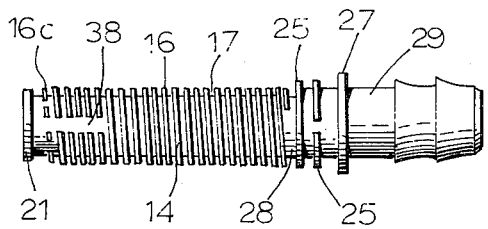
FIG. 3, shows a view of the male part of the trickler in which is shown the cut section, the coupler and the duct.
Figure 3A:
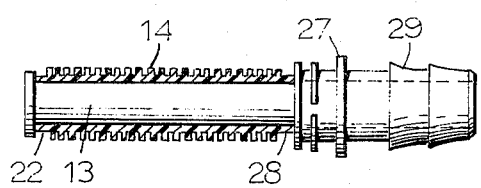
Figure 3B:
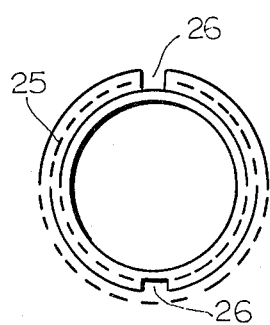
Figure 3C:
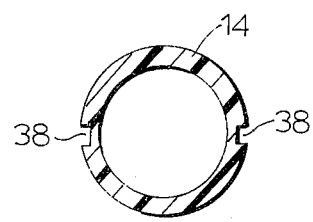
Figure 3D:
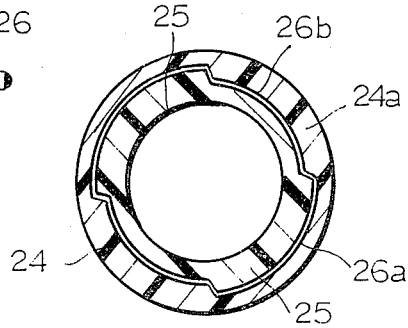

FIG. 3 a, shows a lateral view part in cut of the male part of the trickler.

FIG. 3 b, shows a view in transversal cut of the locks of the male section, showing the grooves.

FIG. 3 c, shows a view in transversal cut of the male section showing the ducts.

FIG. 3 d, shows a view in transversal cut of the locks of the male part and of the grooves of the female part.

FIG. 4, shows part cut, a trickler connected to a hose or pipe.

FIG. 5, shows a lateral view in cut of the reduction T connector and of the belt that is used to fast the hose or pipe in which it is going to be connected.

FIG. 6, shows a top view of the reduction T connector that it is used to connect a secondary line to a main conduction line.

FIG. 7, shows a bottom view of the reducing T connector that is used to connect the secondary line to the main conduction line.

FIG. 8, shows a diagrammatic view of the line to which there are connected several tricklers and to which due to a reduction T connector, object of this application, there are connected several secondary lines.

In reference to these figures, the irrigation system, object of this application, consists of utilizing for irrigation, hoses and flexible or rigid pipes to which at different intervals, depending of the needs, will be connected tricklers and on the other hand, when necessary will be connected secondary lines to the main lines by a reduction T connector.

Figure 1:
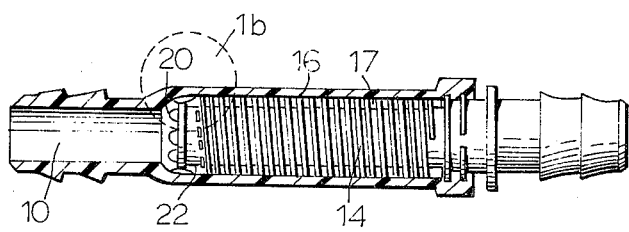
Figure 2:
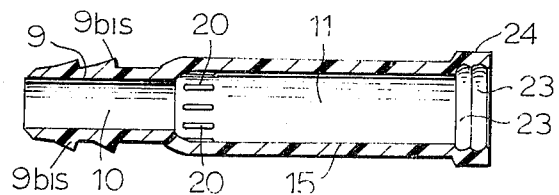
FIG. 2, shows a lateral view in cut of the female part of the trickler.

The trickler (1) is formed basically by two parts, the female parts (FIG. 2) and the male part (FIG. 3), the female part has in one of the ends a coupler (9) that has the form of several cones overlapped in the center of which there is an entrance hole (10), the objective of the overlapped cones is to give a mean of fastening to that end (9) to the inside of the hose or flexible or rigid pipe to which it is going to be connected. By means of the entrance hole (10) it is possible that the liquid flowing through the pipe (12) goes to the interior of the conduction chamber (13). The female part (FIG. 2) has an admission chamber (11) of a diameter that allows the entrance of the screw part (14) of the male part (FIGS. 3, 3 a) after they have been coupled and ready to work. It is important to show that when both parts have been coupled, the inside wall (15) of the admission chamber (11) and the borders (16) of the screw part (14) get in contact that is, there is no space between the inside wall (15) and the border (16) of the screw part (14), this is very important since the only exit conduct for the liquid will be the cavity (17) formed by the screw through its trajectory in such a form that at its end the liquid can flow to the outside after the phenomenon that will be described will happen:

The liquid flows first through the main line (18), then by means of a reduction T connector (5) the liquid moves to the secondary lines (12) through which it goes to the tricklers (1) and moves to the inside of them through the entrance hole; however, most of the liquid will continue flowing through the conduction chamber (13), but part of the liquid that goes through the entrance hole (10) will flow through the spaces (19) that result from the strias (20) and the butt (21) of the male part. Between the butt (21) of the male part and the first border (16) of the screw section (14) there is an space of a greater dimension that formed by the borders (16), this space that is called feeding chamber (22) allows the flow of enough liquid to insure the constant flow to the cavity (17); the liquid first when flowing to the feeding chamber (22) and along the cavity (17), loses energy in such an amount that when leaving the cavity (17) it loses pressure, obtaining with this a constant flow, which is regulated using the ducts (38) modifying the dimensions of the cavity or the operation conditions or the system according to the needs of the crop and the characteristics of the irrigation system. The male part (FIG. 3) can have a regulating duct (38) that is located along the screw part (14) and intercepts one or more borders (16), and that can have a variable length and caliber; this length and caliber will change in relation to the needs of the flow required by the field that is going to be irrigated, for such a purpose it is necessary to indicate that for a larger flow or to increase the volume of the applied liquid, will be a longer and wider duct and for on smaller flow a short or narrow duct; the regulating duct (38) can be one or more, changing the number also depending upon the needs of the flow. It is important to clarify that the spaces (19) are smaller in dimension than the cavity (17) in such a way that through the spaces (19) can not enter sediments of solid particles that could block or clog the cavity (17) or to stop or decrease the flow of the liquid and if a particle enters through the spaces (19) it will be of on smaller size than that of the cavity (17) and will move through the cavity and in most cases expelled to the outside.

To insure the continuous flow of the liquid of the feeding chamber (22) to the cavity (17), the first border (16 b) of the crew part (14) can have one or more entrance grooves (16 c) or to be of a shorter height than the rest of the border (16), leaving on space (17 a), in such a way that the flow to the cavity (17) never can be interrupted these grooves (16 c) and spaces (17 a) most be of smaller dimension than that of the cavity (17) with the purpose that if a solid particle passes it will move freely along the cavity because of the larger dimension of the latter.

In the opposite end of the coupler (9) of the female part, there are grooves (23) that form borders (24) to insure the locks (25) of the male part in such a way that once they have been coupled they are joined solidly and it is impossible for them to loosen accidentally. However, it is possible to make locks which allow coupling and uncoupling of the female and male parts. If this is the case (FIG. 3 d), the borders (24) will have grooves large enough (26 a) through which the locks of the male part (25) can enter and which also have large grooves (26 d) and after they have enter, the male part or the female part will be rotated in such a way that the locks (25) of the male part will coincide with the border (24) of the female part, in this form the male part (FIG. 3) will not be uncoupled accidentally until the male part will be rotated intentionally (FIG. 3 d) to coincide the locks (25) with the grooves (26 a) of the borders (24) of the female part. The channels formed below the border (24 a) may be of different depths or forms, inclusive to the point of being holes in which the insertion of the locks can be possible. When this locking system, is wanted the grooves (26 b) of the locks (25) of the male part will have a slightly greater dimension than the border (24 a) of the female part. When this system is used it will be necessary that the protection ring (27) will have two flat ears that ease the rotation of the male part that at the same time will be marks to know if the locks are in phase.

The locks (25) of the male part (FIG. 3 b) each have a groove (26) that will be convenient to be in opposite sides this to impede the entrance of solid particle from the outside that could affect the exit of the liquid.

The male part has a protecting ring (27) which has the objective of impeding the entrance of particles to the inside of the locks and consequently to the inside of the trickler (1), that will affect its correct operation.

The male part has a cavity between the last cord of the screw section (14) and the first lock (25) that forms the exit chamber (28) and has two main functions; first, to insure the constant flow of the liquid to the outside, and second, to let the liquid flow to the outside even when a particle has accidentally entered through the exit of the trickler.

The male part has a coupler (29) which is equal to the coupler (9), referred at the beginning, it is formed by inverted overlapped cones through which in the inside passes an orifice that is the continuation of that previously referred with number (10); the coupler (29) serves to join other end of another hose or pipe to the rest of the line.

In regard to the reduction T connector, it is formed by a coupler (30) that has a series of cones overlapped with the objective to allow the insurance of the coupler (30) to the secondary lines (12), such a reducing T connector has a body (31) that has the form of a flexible channel that allows its connection to hoses of flexible or rigid pipes of different diameters, since its flexibility makes possible to expand or contract it to have always contact with the outside wall (32) of the hoses or pipes to which it is going to be coupled. The reducing T connector has in the inside a pivot (33) that goes in the hole made for that purpose in the pipes or hoses (18); the hole most be of smaller diameter than the pivot (33) and the pivot slightly wider in its base than at the end to insure a tight contact between the borders of the hole made in the hose or pipe (18) and the pivot, avoiding leakage of the liquid flowing through the pipes or hoses.

To insure the reducing T connector to the hose or pipe (18) it has two ears (34) through which is fastened a belt (35) that goes around the pipe or hose (18) and keeps the reducing T connector in the correct position. The reducing T connector has along the pivot (33) and the coupler (30) a hole (36) that can vary in diameter according to the needs or requirements, through this hole flows to the secondary line (12) the liquid coming in the main line (18). The pivot (33) in its high end (37) has an inclination to avoid turbulence and consequently to allow easier entrance of the liquid to the hole (36) that later will flow to the secondary line (12). Both in the trickler and the reducing T connector, their couplers (9-29-30) most be of a larger diameter than the inside diameter of the lines or pipes or the holes through which they are coupled, in such a way that when coupling by the introduction of the coupler to the inside of the pipe or hoses or the made holes, these will make enough pressure over the couplers to have: first, the insurance of the hose or pipe and second, the sealing to avoid the leakage of liquid. In relation to the couplers of the female part (9), the male part (29) and the reducing T connector (30), the cones (9 bis, 29 bis, 30 bis) that form them can vary in diameter as they go to the end; they will be reduced in diameter with the objective that the same tricklers or reducing T connectors can be connected to secundary lines of different diameters. Also, it is necessary to show that the number of cones and the length of the coupler (9-29-30) can change.

Novelty of the Invention

After describing the invention considered as a novelty I demand as property of my represented, the content of the following clauses:

We claim:

1. A trickle irrigation system comprising in combination, two pieces of tubing and an in line trickler of substantially the same size as said tubes affixed therebetween, said trickler having a generally cylindrical male member with a friction fit coupling member on one end for engaging the inner wall of one piece of the tubing to frictionally hold it therein in a fluid tight connection, said male member defining by helical ridges extending therefrom on the outer periphery, a longitudinal central aperture therethrough in which fluid may flow from said tubing, a generally hollow cylindrical mating female member with a smooth interior surface adapted to rest on said ridges and thereby establish a water flow path through the helical path formed by said ridges and further including structure to receive and hold said male member therein at one end and having at the other end a friction fit coupling member to engage the inner wall of the other piece of tubing to frictionally hold it therein in a fluid tight connection and defining a longitudinal aperture therethrough mating with that of the male member so that fluid will flow through said trickler from one tube to the other, and wherein said male and female members have structure disposed therebetween when mated for defining a passageway permitting a portion of the fluid flowing through said tubes to trickle out between the two members comprising, a feeding chamber insuring the continuous flow of water between the two members formed by structure on the butt end of said male member forming a cavity for receiving fluid passing through said tubes and directing it into said helical ridges wherein said ridges have a longitudinal regulating duct disposed therethrough over a portion of said ridges to define a water conveying passageway bypassing said helical path.

2. A trickle irrigation system comprising in combination, two pieces of tubing and an in line trickler of substantially the same size as said tubes affixed therebetween, said trickler having a generally cylindrical male member with a friction fit coupling member on one end for engaging the inner wall of one piece of the tubing to frictionally hold it therein in a fluid tight connection, said male member defining by helical ridges extending therefrom on the outer periphery, a longitudinal central aperture therethrough in which fluid may flow from said tubing, a generally hollow cylindrical mating female member with a smooth interior surface adapted to rest on said ridges and thereby establish a water flow path through the helical path formed by said ridges and further including structure to receive and hold said male member therein at one end and having at the other end a friction fit coupling member to engage the inner wall of the other piece of tubing to frictionally hold it therein in a fluid tight connection and defining a longitudinal aperture therethrough mating with that of the male member so that fluid will flow through said trickler from one tube to the other, and wherein said male and female members have structure disposed therebetween when mated for defining a passageway permitting a portion of the fluid flowing through said tubes to trickle out between the two members comprising, a feeding chamber insuring the continuous flow of water between the two members formed by structure on the butt end of said male member forming a cavity for receiving fluid passing through said tubes and directing it into said helical ridges wherein said female member has therein longitudinally disposed striae for contacting with the end of the male member when mated therein to feed fluid flowing through said tubes into the feeding chamber between the members, and wherein said striae have a smaller dimension than said passageway to thereby prevent entry of particles of a size that could block said passageway.

* * * * *